(12) United States Patent
Itoh et al.

(10) Patent No.: US 7,213,460 B2
(45) Date of Patent: May 8, 2007

(54) ULTRASONIC SENSOR

(75) Inventors: Tomoki Itoh, Nagoya (JP); Makiko Sugiura, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/294,578

(22) Filed: Dec. 6, 2005

(65) Prior Publication Data
US 2006/0156821 A1    Jul. 20, 2006

(30) Foreign Application Priority Data
Jan. 19, 2005    (JP) ............................. 2005-011484

(51) Int. Cl.
*G01H 11/00*    (2006.01)
*H01L 41/08*    (2006.01)

(52) U.S. Cl. ........................ 73/649; 73/651; 310/321

(58) Field of Classification Search ............... 73/651, 73/579, 645–649, 659–661, 584, 596, 627–629; 310/321–322, 329–334
See application file for complete search history.

(56) References Cited

U.S. PATENT DOCUMENTS 5,856,722 A * 1/1999 Haronian et al. ........... 310/321
6,079,274 A * 6/2000 Ando et al. ................. 73/649
6,438,243 B1 * 8/2002 Ikeuchi et al. .............. 381/191
6,651,504 B1 * 11/2003 Datskos ...................... 73/651

FOREIGN PATENT DOCUMENTS

| JP | 4-352950 | * 12/1992 |
| JP | 5-183995 | * 7/1993 |
| JP | A-05-347797 | 12/1993 |
| JP | 6-078399 | * 3/1994 |
| JP | 2002-232995 | * 8/2002 |

* cited by examiner

*Primary Examiner*—Helen Kwok
(74) *Attorney, Agent, or Firm*—Posz Law Group, PLC

(57) ABSTRACT

A receiver of an ultrasonic sensor includes reception elements, each of which has a shape of a flat rectangular plate. The reception elements are arranged one-dimensionally on a plane so that the reception surfaces face the same direction and that the reception elements are aligned with small intervals in the width direction thereof while longitudinal ends of the reception elements at a certain side are aligned in a straight line. The widths and the thicknesses of the reception elements are even, while the longitudes of the reception elements are uneven. The both longitudinal ends of the reception elements are fixed to prohibit the vibration of the ends. The longitudes are designed so that the primary resonance frequencies of the reception elements are uneven.

6 Claims, 7 Drawing Sheets

ULTRASONIC SENSOR

CROSS REFERENCE TO RELATED APPLICATION

This application is based on and incorporates herein by reference Japanese patent application No. 2005-11484 filed on Jan. 19, 2005.

FIELD OF THE INVENTION

The present invention relates to an ultrasonic sensor and in particular to an ultrasonic sensor which converts a received ultrasonic signal to an electric signal or transmits an ultrasonic signal by converting an electric signal to the ultrasonic signal.

BACKGROUND OF THE INVENTION

Conventionally, an ultrasonic sensor is widely used in various fields. For example, it is used as a vertical sonar in an echo sounding machine and a fish detector, as a horizontal sonar for a vessel detecting a direction or a distance to an object, and as an ultrasonic diagnostic equipment for making a diagnosis of an internal organ by imaging the organ.

In addition, developments have been made for using the ultrasonic sensor in an art for monitoring a vehicle periphery and thus contributing to driving safety by detecting a distance to or a two-dimensional or three-dimensional position of an object around the vehicle. To detect the distance or the position, the ultrasonic sensor incorporated in the vehicle transmits an ultrasonic signal which is harmless to humans and receives the ultrasonic signal reflected by the object. For example, a parking assistance system is in practical use for assisting a driver in backing the vehicle in a parking space while avoiding objects such as a human or an obstacle located at the rearward of the vehicle. In the parking assistance system, a device generally referred to as a rear sonar is used which has the ultrasonic sensor at a rear portion of the vehicle and detects the object by means of the ultrasonic sensor.

For example, in the 2nd to 4th pages and FIGS. 1–3 of JP-H5-347797-A, such an ultrasonic sensor (specifically ultrasound probe) used for detecting a position and a distance of a target object is disclosed. Specifically, the ultrasonic sensor in the publication includes a piezoelectric complex and an electrode array. The piezoelectric complex is made of multiple piezoelectric substances which are connected with each other through organic polymers, and the electrode array is made of multiple electrodes which are aligned with intervals among them on a surface of the piezoelectric complex. In addition, portions of the piezoelectric complex overlapping the intervals of the electrode array are filled with filling materials, the dumping factors of which are higher than those of the organic polymers.

In the conventional ultrasonic sensors including the ultrasonic sensor in the publication, a receiver for converting a received ultrasonic signal to an electric signal has a one-dimensional structure or a two-dimensional structure. The one-dimensional structure is constructed by aligning, orderly in a single direction on a plane, multiple vibration plates (which correspond to the electrode array in the publication) with the same size and shape. The two-dimensional structure is constructed by aligning, orderly in lengthwise and crosswise directions on a plane, multiple vibration plates with the same size and shape. In addition, a transmitter of the conventional ultrasonic sensor converts an externally received electric signal to an ultrasonic signal and transmits the ultrasonic signal. The receiver receives at the vibration plates the ultrasonic signal reflected by the target object.

Then, the receiver detects gaps among timings at each of which one of the vibration plates receives the reflected ultrasonic signal. By comparing the detected gaps with the transmitted ultrasonic signal, the ultrasonic sensor can determine the two-dimensional or three-dimensional position of the target object, the distance between the target object and the ultrasonic sensor, etc.

The transmitter of the conventional ultrasonic sensor ordinarily transmits the ultrasonic signal by using a single vibration plate (or sound generation plate). However, a transmitter has been proposed which transmits the ultrasonic signal by using multiple vibration plates, which has the one-dimensional structure or the two-dimensional structure. It is a purpose of the transmitter having the multiple vibration plates to increase transmission power of the ultrasonic signal.

Since the conventional receiver has the structure constructed by aligning the multiple vibration plates with the same size and shape, all vibration plates have the same resonance frequency which causes an acoustic crosstalk among the vibration plates to be larger. Therefore the conventional receiver has a problem in terms of accuracy in determining the position and the distance of the target object.

The ultrasonic sensor in JP-H5-347797-A reduces the acoustic crosstalk among the electrodes (or vibration plates) and improves its azimuth resolution, because the portions of the piezoelectric complex overlapping the intervals of the electrode array are filled with the filling materials having higher dumping factors than those of the organic polymers constituting the piezoelectric complex.

However, the ultrasonic sensor in the publication still has a problem that it requires a manufacturing process for injecting the filling materials, which causes a growth in its manufacturing cost. In addition, the ultrasonic sensor in the publication still has a problem that the volume and the weight of the filling materials cause a growth in the total physical size and the total weight of the ultrasonic sensor. Moreover, the ultrasonic sensor is required recently to transmit an ultrasonic chord in order to improve the accuracy in determining the position and the distance regarding the target object.

SUMMARY OF THE INVENTION

It is therefore an object of the present invention to provide, with a low manufacturing cost, an ultrasonic sensor which:

(1) is small and lightweight and reduces the crosstalk among the vibration plates to make it possible to determine with a high degree of accuracy the position and the distance of the target object; or (2) is capable of transmitting the ultrasound chord.

An ultrasonic sensor of the present invention includes conversion devices for converting a first ultrasonic signal to an electric signal after receiving the first ultrasonic signal, or transmitting a second ultrasonic signal after converting an electric signal to the second ultrasonic signal, wherein sizes of the conversion devices are uneven and primary resonance frequencies of the conversion devices are uneven.

In the case that conversion devices convert the first ultrasonic signal to the electric signal after receiving the first ultrasonic signal, influences of vibrations among the conversion devices can be reduced, because the sizes of the conversion devices are uneven. Therefore an acoustic crosstalk among the conversion devices can be reduced. In addition, accuracy of detecting physical quantities of a target object for the detection can be improved.

In addition, since the effect described above can be achieved by simply making the sizes of the conversion devices uneven, an unordinary process is not necessary in manufacturing the receiver. Therefore, it is possible to reduce the manufacturing cost of the ultrasonic sensor compared to the ultrasonic sensor described in JP-H5-347797-A, which requires a process for injecting the filling materials.

In addition, since the intervals among the conversion devices can be reduced to be minimum for preventing the transmissions of the vibrations among them, the ultrasonic sensor can be designed to be smaller and more lightweight by an amount of the filling materials required for the ultrasonic sensor described in JP-H5-347797-A.

In the case that the conversion devices transmit an ultrasonic signal after converting the electric signal to the second ultrasonic signal, the conversion devices are capable of transmitting an ultrasonic chord, because the conversion devices are uneven.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE INVENTION (First Embodiment)

Figure 1:
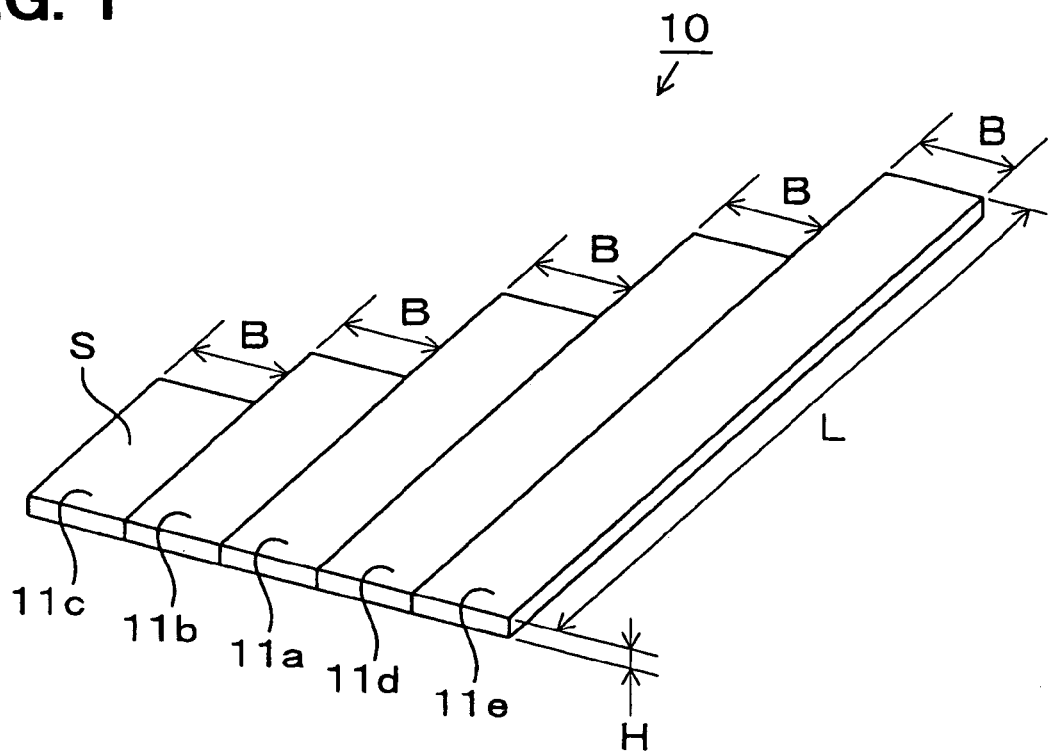
FIG. 1 is a perspective view showing a receiver of an ultrasonic sensor according to a first embodiment of the present invention.

As shown in FIG. 1, a receiver 10 of an ultrasonic sensor according to a first embodiment of the present invention includes five reception elements (i.e. conversion devices) 11a–11e, each of which has a shape of a flat rectangular plate. The reception elements 11a–11e are arranged one-dimensionally on a plane with their reception surfaces S facing the same direction and having the same surface level. In addition, the reception elements 11a–11e are aligned with small intervals in the width direction thereof, while longitudinal ends of the reception elements 11a–11e facing a certain direction are aligned in a straight line. Moreover, the widths B of the reception elements 11a–11e are even, the thicknesses H of the reception elements 11a–11e are even, and the longitudes L of the reception elements 11a–11e are uneven.

Both longitudinal ends of each of the reception elements 11a–11e are fixed to a fixing member (not shown), so that the ends do not vibrate. The receiver 10 may be manufactured in any way. For example, the receiver 10 may be manufactured by constructing each of the reception elements 11a–11e separately and putting them together. Alternatively, the receiver 10 may be manufactured as a single body on a semiconductor substrate by utilizing the MEMS (Micro Electro Mechanical Systems).

[Structure of Reception Elements]

Figure 2:
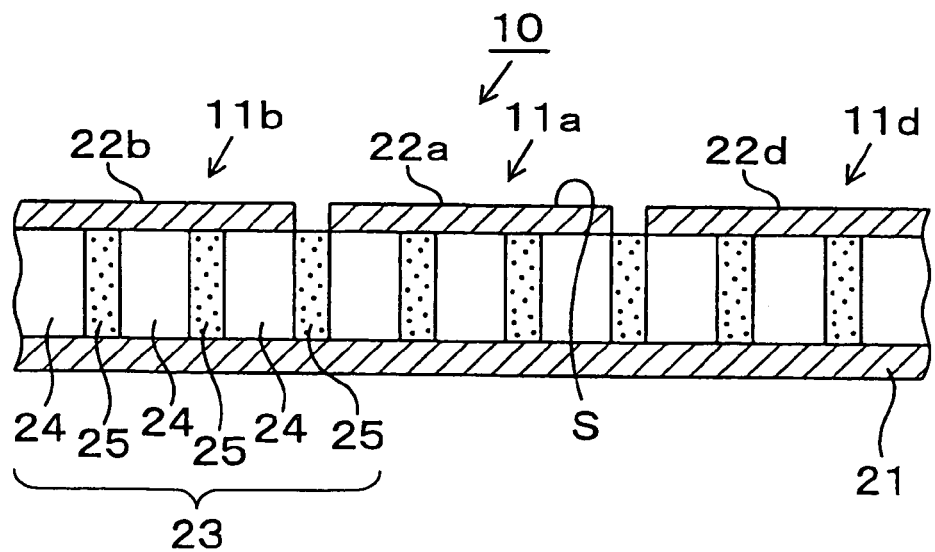
FIG. 2 is a schematic cross-sectional view showing a first structure of reception elements constituting the receiver.
Figure 3:
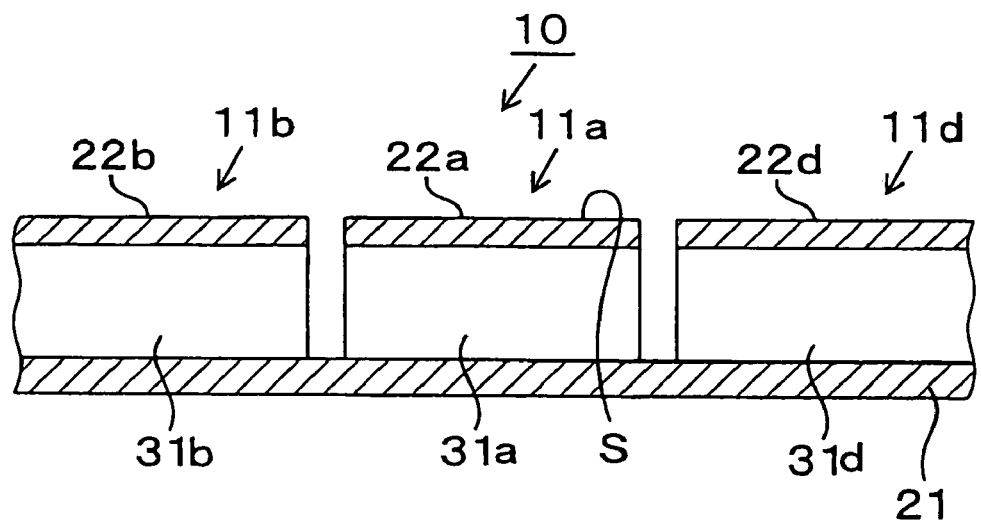
FIG. 3 is a schematic cross-sectional view showing a second structure of reception elements constituting the receiver.
Figure 4:
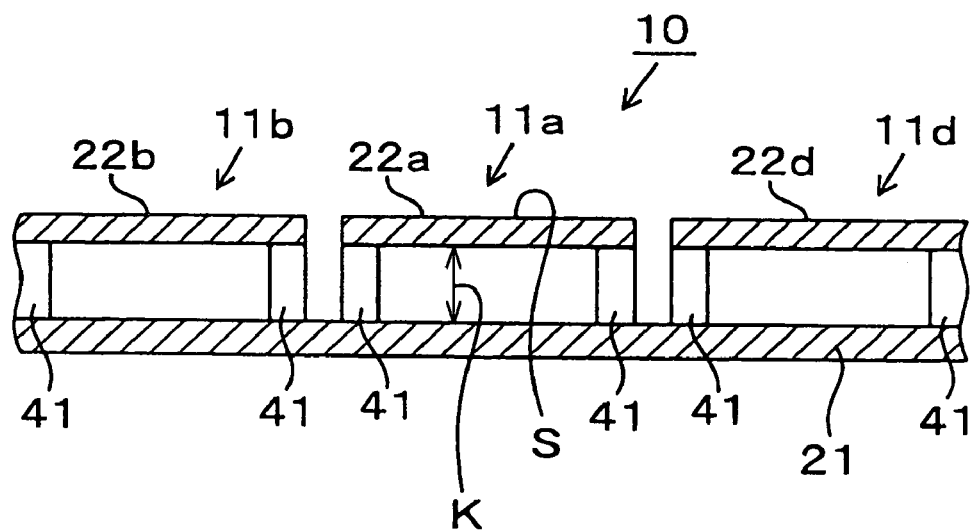
FIG. 4 is a schematic cross-sectional view showing a third structure of reception elements constituting the receiver.

Hereafter, first to third structures of the reception elements 11a–11e are described with reference to the FIGS. 2–4. In FIGS. 2–4, the thicknesses of the reception elements 11a–11e are not drawn to scale and are illustrated larger for illustration purposes.

<First Structure>

In the first structure shown in FIG. 2, a group of the reception elements 11a–11e includes a bottom electrode 21 having a shape of a flat plate, reception electrodes 22a–22e, and a piezoelectric complex 23. Illustration of the reception elements 11c, 11e and the reception electrodes 22c, 22e is omitted in FIG. 2.

Each reception electrode 22a–22e belongs to each reception element 11a–11e, respectively. The reception electrodes 22a–22e are aligned with intervals among them. The intervals are very small but still prevent vibrations for transmitting from one of the reception electrodes 22a–22e to another. It can be said that the reception electrodes 22a–22e are aligned with small or no interval therebetween.

The reception electrodes 22a–22e are located parallel to the flat bottom electrode 21 and the piezoelectric complex 23 is located between the group of reception electrodes 22a–22e and the bottom electrode 21.

The piezoelectric complex 23 has multiple piezoelectric elements 24 and multiple organic polymer layers 25. An upper end of each piezoelectric element 24 is connected with one of the reception electrodes 22a–22e and is not connected with the two neighboring electrodes of the reception electrodes 22a–22e.

A lower end of each piezoelectric element 24 is connected with the bottom electrode 21. The organic polymer layers 25 are filled among the piezoelectric elements 24 and mediate their adhesion. In other words, the piezoelectric elements 24 are embedded in the organic polymer layers 25. Each piezoelectric element 24 is made of a ferroelectric substance such as a PZT. The organic polymer layers 25 are made of, for example, silicon rubber, epoxy resin, or polyurethane resin.

Thus, each reception element 11a–11e has a structure in which a portion of the piezoelectric complex 23 is sandwiched by each reception electrode 22a–22e and a portion of the bottom electrode 21. For example, the reception element 11a is constructed by the reception electrode 22a, a portion of the piezoelectric complex 23, and a portion of the bottom electrode 21, which are arranged in laminae. In addition, the reception element 11b is constructed by the reception electrode 22b, another portion of the piezoelectric complex 23, and another portion of the bottom electrode 21, which are arranged in laminae.

Surfaces of the reception electrodes 22a–22e function as the reception surfaces S. When the reception electrodes 22a–22e vibrate by receiving an ultrasonic signal at the reception surfaces S, their vibrations are transmitted to the piezoelectric complex 23 and the piezoelectric complex 23 vibrates. The vibration of the piezoelectric complex 23 generates an electric signal as a result of a piezoelectric effect and the electric signal is output through wirings (not shown) connected with the reception electrodes 22a–22e and the bottom electrode 21.

As described above, in the reception elements 11a–11e of the first structure, a vibration plate is constructed by a laminated structure of the reception electrodes 22a–22e, bottom electrode 21, and the piezoelectric complex 23, and the ultrasonic signal received by the vibration plate is converted to the electric signal.

<Second Structure>

In the second structure shown in FIG. 3, a group of another reception elements 11a–11e includes the bottom electrode 21, the reception electrodes 22a–22e, and dielectric layers 31a–31e made of a ferroelectric substance such as a PZT. Illustration of the reception elements 11c, 11e, the reception electrodes 22c, 22e, and the dielectric layers 31c, 31e is omitted in FIG. 3.

Each dielectric layer 31a–31e is located between each reception electrode 22a–22e and the bottom electrode 21, respectively.

Each reception element 11a–11e has a structure in which each dielectric layer 31a–31e is sandwiched by each reception electrodes 22a–22e and the bottom electrode 21. For example, the reception element 11a is constructed by the reception electrode 22a, the dielectric layer 31a, and a portion of the bottom electrode 21, which are arranged in laminae. In addition, the reception element 11b is constructed by the reception electrode 22b, the dielectric layer 31b, and another portion of the bottom electrode 21, which are arranged in laminae.

The reception electrodes 22a–22e are aligned with intervals among them and the dielectric layers 31a–31e are aligned with the intervals among them. The intervals are very small but still prevent vibrations transmitting from one of the reception electrodes 22a–22e to another and from one of the dielectric layers 31a–31e to another. It can be said that the reception electrodes 22a–22e and dielectric layers 31a–31e are aligned with little intervals.

In this case, the surfaces of the reception electrodes 22a–22e function as the reception surfaces S. When the reception electrodes 22a–22e vibrate by receiving the ultrasonic signal at the reception surfaces S, the vibrations are transmitted to the dielectric layers 31a–31e and the dielectric layers 31a–31e vibrate. The vibrations of the dielectric layers 31a–31e generate electric signals as a result of the piezoelectric effect and the electric signals are output through the wirings (not shown) connected with the reception electrodes 22a–22e and the bottom electrode 21.

As described above, in the reception elements 11a–11e of the second structure, a vibration plate is constructed by a laminated structure of the reception electrodes 22a–22e, bottom electrode 21, and the dielectric layers 31a–31e, and the ultrasonic signal received by the vibration plate is converted to the electric signals.

<Third Structure>

In the third structure shown in FIG. 4, a group of the reception elements 11a–11e as capacitance type reception elements includes the bottom electrode 21, the reception electrodes 22a–22e, and supporting members 41.

Each pair of the supporting members 41 is located between each reception electrode 22a–22e and the bottom electrode 21. Each reception electrode 22a–22e and the bottom electrode 21 are facing each other with an interval K which is maintained by the supporting members 41. The bottom electrode 21 functions as a fixed electrode by being fixed so that it does not vibrate. Each of the reception electrodes 22a–22e functions as a movable electrode by being allowed to vibrate.

Each reception element 11a–11e is constructed by each reception electrode 22a–22e and the bottom electrode 21. For example, the reception element 11a is constructed by the reception electrode 22a and a portion of the bottom electrode 21, and the reception element 11b is constructed by the reception electrode 22b and another portion of the bottom electrode 21.

The reception electrodes 22a–22e are aligned with intervals among them. The intervals are very small but still prevent vibrations transmitting from one of the reception electrodes 22a–22e to another. In other words, the reception electrodes 22a–22e are aligned with little intervals.

In this case, the surfaces of the reception electrodes 22a–22e function as the reception surfaces S. When the reception electrodes 22a–22e vibrate by receiving the ultrasonic signal at the reception surfaces S, the distances between the reception electrodes 22a–22e and the bottom electrode 21 change and capacitances between the reception electrodes 22a–22e and the bottom electrode 21 also change. The changes in the capacitances are converted to the electric signals through the wirings (not shown) connected with the reception electrodes 22a–22e and the bottom electrode 21.

As described above, in the reception elements 11a–11e of the third structure, a vibration plate is constructed by the reception electrodes 22a–22e, and the ultrasonic signal received by the vibration plate is converted to the electric signals.

[Effect and Advantage of First Embodiment]

Hereafter effects and advantages of the ultrasonic sensor according to the first embodiment will be described.

[1-1]

A transmitter (not shown) of the ultrasonic sensor which is constructed separately of the receiver 10 transmits an ultrasonic signal to a target object for detection, and the reception elements 11a–11e of the receiver 10 receive the ultrasonic signal reflected by the target object.

The receiver 10 detects gaps among timings at each of which one of the reception elements 11a–11e receives the reflected ultrasonic signal. Then the receiver 10 determines the two-dimensional or three-dimensional position of the target object and a distance to the target object by comparing the detected gaps with the ultrasonic signal transmitted by the transmitter. The transmitter may be of any type, including the piezoelectric type and the capacitance type.

[1-2]

Figure 5:
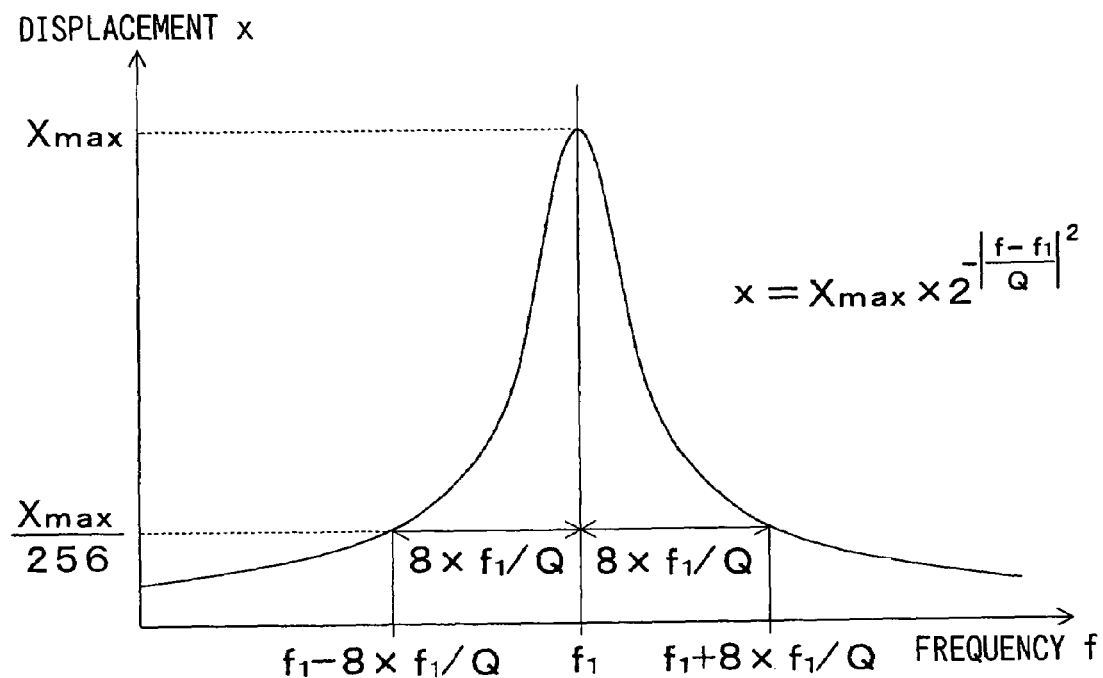
FIG. 5 is a graph showing a relation between frequency f and displacement x of a vibration plate fixed at both longitudinal ends.

As shown in FIG. 5, the vibration plate fixed at its both ends has resonance characteristics that a displacement x of the vibration plate vibrating at a frequency f is determined by an equation E1, $$x = X_{max} \times 2^{-\left|\frac{f-f_1}{Q}\right|^2}, \quad \text{E1}$$

where Xmax is the maximum displacement, f1 is the primary resonance frequency, and Q is a resonance value of the vibration plate.

As shown in FIG. 5, the displacement x becomes 1/256 of the Xmax in the case when the frequency f is different by ±8×f1/Q from the primary resonance frequency f1.

The relation represented by the equation E1 is valid for the reception elements $11a$–$11e$, because they can be regarded as the vibration plates both ends of which are fixed. The reception elements $11a$–$11e$ have the same resonance value Q if they have the same structure.

In the case that F1$b$ is larger by 8×F1$a$/Q than F1$a$ and F1$d$ is smaller by 8×F1$a$/Q than F1$a$, wherein F1$a$, F1$b$, and F1$d$ are the primary resonance frequencies of the reception elements $11a$, $11b$, and $11d$ respectively, an influence of the vibration of each one of the reception elements $11a$, $11b$, and $11d$ on the other ones of the reception elements $11a$, $11b$, and $11d$ is 1/256 of the maximum influence.

In addition, it is preferable that the primary resonance frequency F1$c$ of the reception element $11c$ located in alignment with (specifically next to) the reception element $11b$ is larger by 8×F1$b$/Q than F1$b$. Moreover, it is preferable that the primary resonance frequency F1$e$ of the reception element $11e$ located in alignment with (specifically next to) the reception element $11d$ is smaller by 8×F1$d$/Q than F1$d$.

Thus, by making the primary resonance frequencies F1$a$–F1$e$ different from each other, the influences between their vibrations can be reduced to 1/256 of the maximum influence, which is practically negligible. Then an acoustic crosstalk among the reception elements $11a$–$11e$ can be diminished and accuracy of determining the position and the distance of the target object can be improved.

[1-3]

The primary resonance frequency f1 of a vibration plate fixed at its both end is calculated from an equation E2:

$$f_1 = \frac{\sqrt{B \times H^3}}{L^2}, \quad \text{E2}$$

wherein, L, B, H are the longitude, the width and the thickness (or height) of the vibration plate.

The relation represented by the equation E2 is valid for the reception elements $11a$–$11e$, because they can be regarded as the vibration plates both ends of which are fixed.

Therefore, the primary resonance frequencies F1$a$–F1$e$ of the reception elements $11a$–$11e$ can be calculated by equations E3–E7:

$$F_{1a} = \frac{\sqrt{B \times H^3}}{L_a^2} = \frac{\alpha}{L_a^2} \quad \text{E3}$$

$$F_{1b} = \frac{\sqrt{B \times H^3}}{L_b^2} = \frac{\alpha}{L_b^2}, \quad \text{E4}$$

$$F_{1c} = \frac{\sqrt{B \times H^3}}{L_c^2} = \frac{\alpha}{L_c^2}, \quad \text{E5}$$

$$F_{1d} = \frac{\sqrt{B \times H^3}}{L_d^2} = \frac{\alpha}{L_d^2}, \quad \text{E6}$$

$$F_{1e} = \frac{\sqrt{B \times H^3}}{L_e^2} = \frac{\alpha}{L_e^2}, \quad \text{E7}$$

wherein B and H are the width and the thickness of the reception elements $11a$–$11e$, La–Le are the longitudes of the reception elements $11a$–$11e$ respectively, and $\alpha$ is $(B \times H^3)^{1/2}$.

Then, by substituting the equations E3 and E4 into the equation (F1$b$=F1$a$+8×F1$a$/Q) representing the primary resonance frequency F1$b$ of the reception element $11b$, an equation E8

$$L_b = L_a \sqrt{\frac{Q}{Q+8}} \quad \text{E8}$$

is obtained.

In addition, by substituting the equations E3 and E6 into the equation (F1$d$=F1$a$−8×F1$a$/Q) representing the primary resonance frequency F1$d$ of the reception element $11d$, an equation E9

$$L_d = L_a \sqrt{\frac{Q}{Q-8}} \quad \text{E9}$$

is obtained.

In addition, by substituting the equations E4 and E5 into the equation (F1$c$=F1$b$+8×F1$b$/Q) representing the primary resonance frequency F1$c$ of the reception element $11c$, an equation E10

$$L_c = L_b \sqrt{\frac{Q}{Q+8}} = L_a \left(\frac{Q}{Q+8}\right) \quad \text{E10}$$

is obtained.

In addition, by substituting the equations E6 and E7 into the equation (F1$e$=F1$d$−8×F1$d$/Q) representing the primary resonance frequency F1$e$ of the reception element $11e$, an equation E11

$$L_e = L_d \sqrt{\frac{Q}{Q-8}} = L_a \left(\frac{Q}{Q-8}\right) \quad \text{E11}$$

is obtained.

Therefore, relative values of the longitudes Lb–Le of the reception elements 11b–11e to the longitude La of the reception element 11a can be calculated by obtaining the resonance value Q through a simulation or an experimental measurement and substituting the obtained resonance value Q into the equations E8–E11.

For example, if the resonance value Q equals 60, the Lb, Lc, Ld, and Le approximately equal 0.94×La, 0.88×La, 1.07×La, and 1.15×La,

[1-4]

The effects and the advantages described in [1-2] can be brought in practice by adjusting the lengths La–Le of the reception elements 11a–11e as described in [1-3].

Thus, in the first embodiment, the acoustic crosstalk among the reception elements 11a–11e can be diminished and the accuracy of determining the position and the distance of the target object can be improved, by making the lengths La–Le uneven so that their primary resonance frequencies become uneven.

In addition, since the effects and the advantages of the first embodiment can be achieved by simply making the lengths La–Le uneven, an unordinary process is not necessary in manufacturing the receiver 10. Therefore, it is possible to reduce the manufacturing cost of the receiver 10 compared to the receiver described in JP-H5-347797-A which requires a process for injecting the filling materials.

In addition, since the intervals among the reception elements 11a–11e can be minimized for preventing the transmissions of the vibrations among them, the receiver 10 can be designed to be smaller and more lightweight by an amount of the filling materials required for the receiver described in JP-H5-347797-A.

[1-5]

Figure 6:
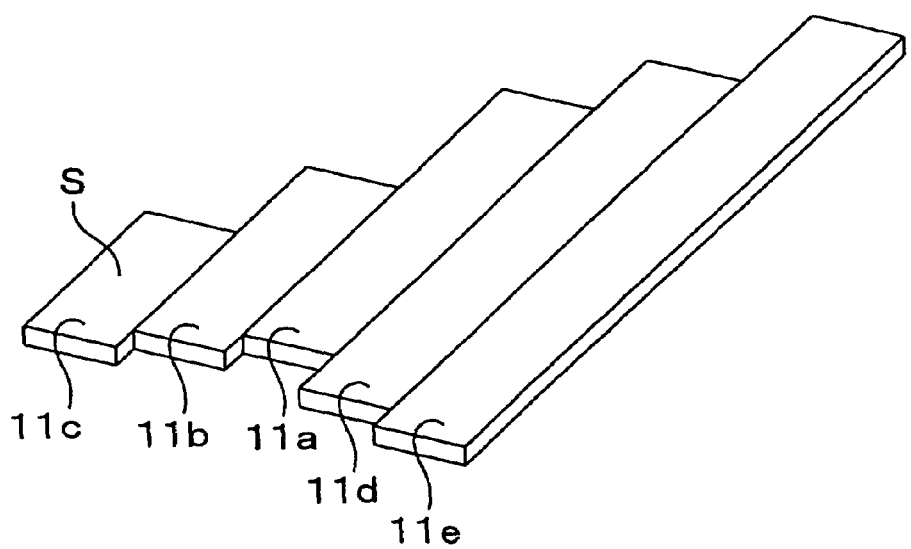
FIG. 6 is a perspective view showing a first modification of the first embodiment.

As shown in FIG. 6, the reception elements 11a–11e may be aligned so that neither of groups of longitudinal ends at the same longitudinal side of the reception elements 11a–11e is aligned in a straight line.

Figure 7:
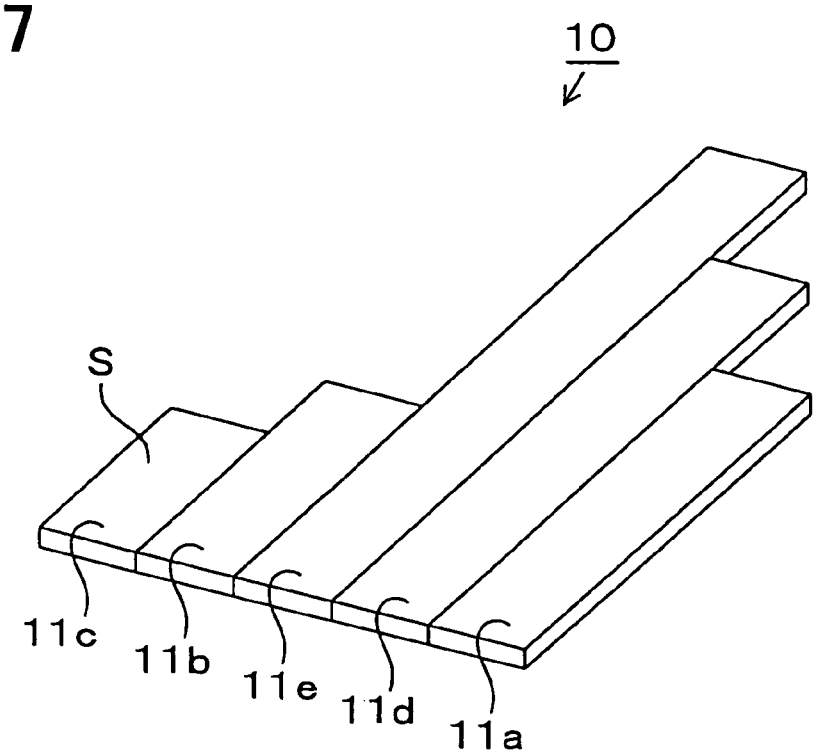
FIG. 7 is a perspective view showing a second modification of the first embodiment.

In addition, it is not necessary to align, as shown in FIG. 1, the reception elements 11a–11e in the order of their longitudes L. As shown in FIG. 7, the reception elements 11a–11e may be aligned in an arbitrary order irrespective of their longitudes L.

In the above two cases shown in FIGS. 1 and 7, as long as the transmissions of the vibrations among the reception elements 11a–11e are perfectly blocked, there is no difference between the two cases in the effect of diminishing the acoustic crosstalk.

However, since it is impossible to perfectly block the transmissions among the reception elements 11a–11e, there is a small difference between the two cases in the effect of diminishing the acoustic crosstalk.

(Second Embodiment)

Figure 8:
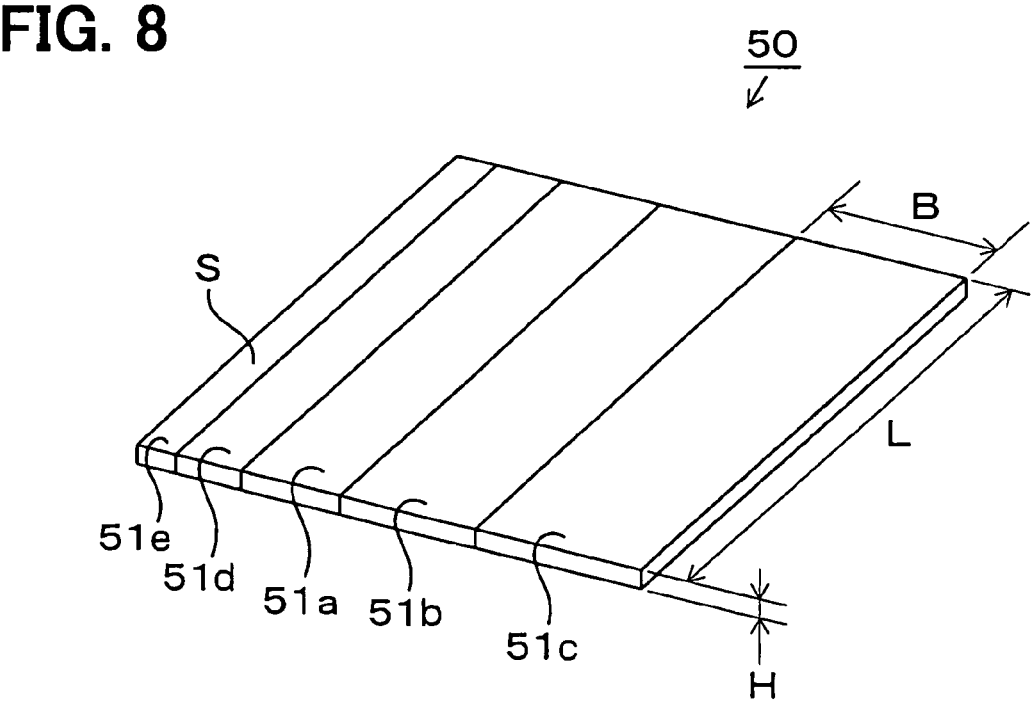
FIG. 8 is a perspective view showing a receiver of an ultrasonic sensor according to a second embodiment of the present invention.

An ultrasonic sensor of a second embodiment is different from that of the first embodiment in that the ultrasonic sensor of the second embodiment has the receiver 50 shown in FIG. 8 in place of the receiver 10. As shown in FIG. 8, the receiver 50 includes five reception elements (i.e. conversion devices) 51a–51e, each of which has a shape of a flat rectangular plate.

The reception elements 51a–51e are arranged one-dimensionally on a plane with their reception surfaces S having the same surface level. Specifically, the reception surfaces S face the same direction and the reception elements 51a–51e are aligned with small intervals in the width direction thereof. In the alignment, each of a first longitudinal ends and a second longitudinal ends of the reception elements 51a–51e is aligned in a straight line, where the first longitudinal ends consist of longitudinal ends of the reception elements 51a–51e at a certain side of the reception elements 51a–51e, and the second longitudinal ends consist of longitudinal ends of the reception elements 51a–51e at the other side, that is, the opposite side to the certain direction. In addition, the widths B of the reception elements 51a–51e are uneven, the thicknesses H of the reception elements 51a–51e are even, and the longitudes L of the reception elements 51a–51e are even.

Both longitudinal ends of each of the reception elements 51a–51e are fixed to a fixing member (not shown), so that the ends do not vibrate. The receiver 50 may be manufactured in any way. For example, the receiver 50 may be manufactured by constructing each of the reception elements 51a–51e separately and putting them together. Alternatively, the receiver 50 may be manufactured as a single body on a semiconductor substrate by utilizing the MEMS (Micro Electro Mechanical Systems). Structures of the reception elements 51a–51e are the same as those of the reception elements 11a–11e.

[Effects and Advantage of Second Embodiment]

The ultrasonic sensor of the second embodiment has effects and advantages as described below, as well as the effects and the advantages of the first embodiment described in [1-1].

[2-1]

The reception elements 51a–51e also have the resonance characteristics as shown in FIG. 5 and the equation E1, because the reception elements 51a–51e can be regarded as vibration plates both ends of which are fixed.

Therefore, in the case that F5b is larger by 8×F5a/Q than F5a and F5d is smaller by 8×F5a/Q than F5a, wherein F5a, F5b, and F5d are the primary resonance frequencies of the reception elements 51a, 51b, and 51d respectively, an influence of the vibration of each one of the reception elements 51a, 51b, and 51d on the other ones of the reception elements 51a, 51b, and 51d is 1/256 of the maximum influence.

In addition, it is preferable that the primary resonance frequency F5c of the reception element 51c located in alignment with (specifically next to) the reception element 51b is larger by 8×F5b/Q than F5b. Moreover, it is preferable that the primary resonance frequency F5e of the reception element 51e located in alignment with (specifically next to) the reception element 51d is smaller by 8×F5d/Q than F5d.

Thus, by making the primary resonance frequencies F5a–F5e different from each other, the influences between their vibrations can be reduced to 1/256 of the maximum influence, which is practically negligible. Then an acoustic crosstalk among the reception elements 51a–51e can be diminished and accuracy of determining the position and the distance of the target object can be improved.

[2-2]

The relation represented by the equation E2 is also valid for the reception elements 51a–51e, because they can be regarded as the vibration plates both end of which are fixed.

Therefore, the primary resonance frequencies F5a–F5e of the reception elements 51a–51e can be calculated by equations E12–E16:

$$F_{5a} = \frac{\sqrt{B_a \times H^3}}{L^2} = \beta\sqrt{B_a},$$ E12

$$F_{5b} = \frac{\sqrt{B_b \times H^3}}{L^2} = \beta\sqrt{B_b},$$ E13

$$F_{5c} = \frac{\sqrt{B_c \times H^3}}{L^2} = \beta\sqrt{B_c},$$ E14

$$F_{5d} = \frac{\sqrt{B_d \times H^3}}{L^2} = \beta\sqrt{B_d},$$ E15

$$F_{5e} = \frac{\sqrt{B_e \times H^3}}{L^2} = \beta\sqrt{B_e},$$ E16 wherein L and H are the longitude and the thickness of the reception elements 51a–51e, Ba–Be are the widths of the reception elements 51a–51e respectively, and $\beta$ is $H^{3/2}/L^2$.

Then, by substituting the equations E12 and E13 into the equation (F5b=F5a+8×F5a/Q) representing the primary resonance frequency F5b of the reception element 51b, an equation E17

$$B_b = B_a\left(1 + \frac{8}{Q}\right)^2$$ E17 is obtained.

In addition, by substituting the equations E12 and E15 into the equation (F5d=F5a−8×F5a/Q) representing the primary resonance frequency F5d of the reception element 51d, an equation E18

$$B_d = B_a\left(1 - \frac{8}{Q}\right)^2$$ E18 is obtained.

In addition, by substituting the equations E13 and E14 into the equation (F5c=F5b+8×F5b/Q) representing the primary resonance frequency F5c of the reception element 51c, an equation E19

$$B_c = B_b\left(1 + \frac{8}{Q}\right)^2 = B_a\left(1 + \frac{8}{Q}\right)^4$$ E19 is obtained.

In addition, by substituting the equations E15 and E16 into the equation (F5e=F5d−8×F5d/Q) representing the primary resonance frequency F5e of the reception element 51e, an equation E20

$$B_e = B_d\left(1 - \frac{8}{Q}\right)^2 = B_a\left(1 - \frac{8}{Q}\right)^4$$ E20 is obtained.

Therefore, relative values of the widths Bb–Be of the reception elements 51b–51e to the width Ba of the reception element 51a can be calculated by obtaining the resonance value Q through a simulation or an experimental measurement and substituting the obtained resonance value Q into the equations E17–E20.

For example, if the resonance value Q equals 60, the Bb, Bc, Bd, and Be approximately equal 1.28×Ba, 1.65×Ba, 0.75×Ba, and 0.56×Ba.

[2-3]

The effects and the advantages described in [2-1] can be brought in practice by adjusting the widths Ba–Be of the reception elements 51a–51e as described in [2-2]

Thus, in the second embodiment, the acoustic crosstalk among the reception elements 51a–51e can be diminished and the accuracy of determining the position and the distance of the target object can be improved, by making the widths Ba–Be uneven so that their primary resonance frequencies become uneven.

In addition, since the effects and the advantages of the second embodiment can be achieved by simply making the widths Ba–Be uneven, an unordinary process is not necessary in manufacturing the receiver 50. Therefore, it is possible to reduce the manufacturing cost of the receiver 50 compared to the receiver described in JP-H5-347797-A which requires a process for injecting the filling materials.

In addition, since the intervals among the reception elements 51a–51e can be minimum for preventing the transmissions of the vibrations among them, the receiver 50 can be designed to be smaller and more lightweight by an amount of the filling materials required for the receiver described in JP-H5-347797-A.

Moreover, in the second embodiment, since the receiver 50 has a shape of a flat rectangular plate as a whole, structures for fixing both longitudinal ends of the reception elements 51a–51e can be simpler than those of the receiver 10 of the first embodiment. Therefore, it is possible to manufacture the receiver 50 more easily, which reduces the manufacturing cost of the receiver 50.

[2-4]

Figure 9:
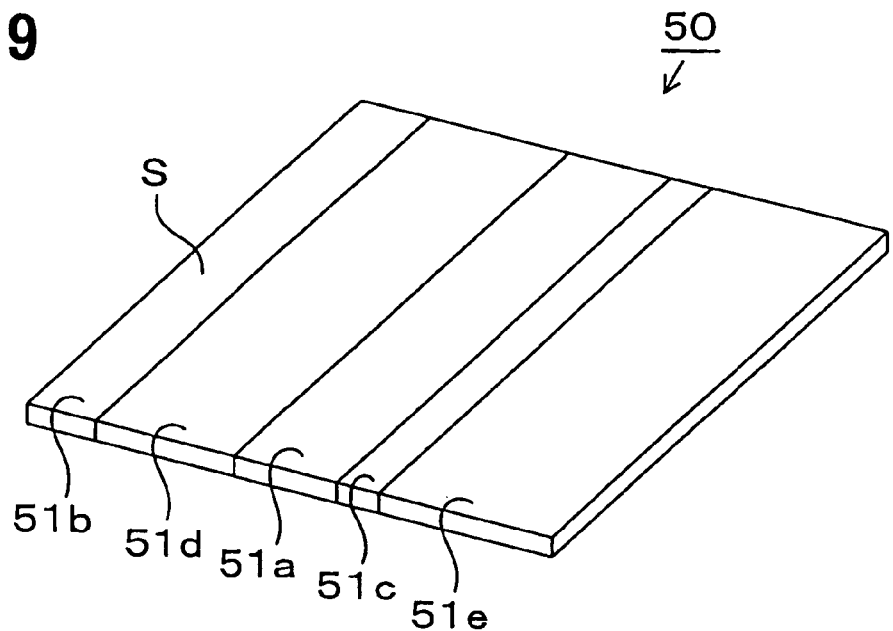
FIG. 9 is a perspective view showing a modification of the second embodiment.

It is not necessary to align, as shown in FIG. 8, the reception elements 51a–51e in the order of their widths B. As shown in FIG. 9, the reception elements 51a–51e may be aligned in an arbitrary order irrespective of their widths B.

In the above two cases shown in FIGS. 8 and 9, as long as the transmissions of the vibrations among the reception elements 51a–51e are perfectly blocked, there is no difference between the two cases in the effect of diminishing the acoustic crosstalk.

However, since it is impossible to perfectly block the transmissions among the reception elements 51a–51e, there is a small difference between the two cases in the effect of diminishing the acoustic crosstalk.

(Third Embodiment)

Figure 10:
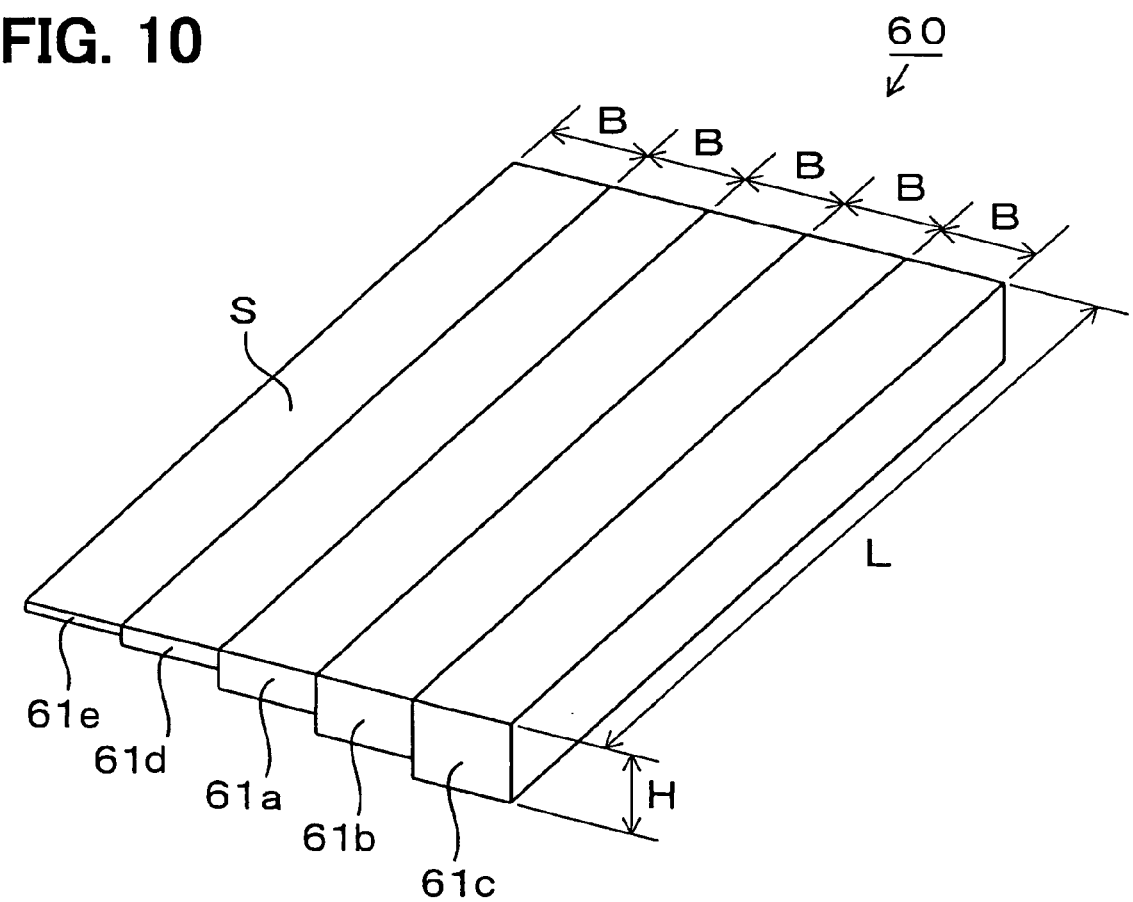
FIG. 10 is a perspective view showing a receiver of an ultrasonic sensor according to a third embodiment of the present invention.

An ultrasonic sensor of a third embodiment is different from that of the first embodiment in that the ultrasonic sensor of the third embodiment has the receiver 60 shown in FIG. 10 in place of the receiver 10. As shown in FIG. 10, the receiver 60 includes five reception elements (i.e. conversion devices) 61a–61e, each of which has a shape of a flat rectangular plate.

The reception elements 61a–61e are arranged one-dimensionally on a plane with their reception surfaces S having the same surface level. Specifically, the reception surfaces S face the same direction and the reception elements 61a–61e are aligned with small intervals in the width direction thereof. In the alignment, each of a first longitudinal ends and a second longitudinal ends of the reception elements 61a–61e is aligned in a straight line, where the first longitudinal ends consist of longitudinal ends of the reception elements 61a–61e at a certain side of the reception elements 61a–61e, and the second longitudinal ends consist of longitudinal ends of the reception elements 61a–61e at the other side, that is, the opposite side to the certain direction. In addition, the widths B of the reception elements 61a–61e are even, the thicknesses H of the reception elements 61a–61e are uneven, and the longitudes L of the reception elements 61a–61e are even.

Both longitudinal ends of each of the reception elements 61a–61e are fixed to a fixing member (not shown), so that the ends do not vibrate. The receiver 60 may be manufactured in any way. For example, the receiver 60 may be manufactured by constructing each of the reception elements 61a–61e separately and putting them together. Alternatively, the receiver 60 may be manufactured as a single body on a semiconductor substrate by utilizing the MEMS (Micro Electro Mechanical Systems). Structures of the reception elements 61a–61e are the same as those of the reception elements 11a–11e.

[Effects and Advantage of Third Embodiment]

The ultrasonic sensor of the second embodiment has effects and advantages as described below, as well as the effects and the advantages of the first embodiment described in [1-1].

[3-1]

The reception elements 61a–61e also have the resonance characteristics as shown in FIG. 5 and the equation E1, because the reception elements 61a–61e can be regarded as vibration plates both ends of which are fixed.

Therefore, in the case that F6b is larger by 8×F6a/Q than F6a and F6d is smaller by 8×F6a/Q than F6a, wherein F6a, F6b, and F6d are the primary resonance frequencies of the reception elements 61a, 61b, and 61d respectively, an influence of the vibration of each one of the reception elements 61a, 61b, and 61d on the other ones of the reception elements 61a, 61b, and 61d is 1/256 of the maximum influence.

In addition, it is preferable that the primary resonance frequency F6c of the reception element 61c located in alignment with (specifically next to) the reception element 61b is larger by 8×F6b/Q than F6b. Moreover, it is preferable that the primary resonance frequency F6e of the reception element 61e located in alignment with (specifically next to) the reception element 61d is smaller by 8×F6d/Q than F6d.

Thus, by making the primary resonance frequencies F6a–F6e different from each other, the influences between their vibrations can be reduced to 1/256 of the maximum influence. Then an acoustic crosstalk among the reception elements 61a–61e can be diminished and accuracy of determining the position and the distance of the target object can be improved.

[2-2]

The relation represented by the equation E2 is also valid for the reception elements 61a–61e, because they can be regarded as the vibration plates both ends of which are fixed.

Therefore, the primary resonance frequencies F6a–F6e of the reception elements 61a–61e can be calculated by equations E21–E25:

$$F_{6a} = \frac{\sqrt{B \times H_a^3}}{L^2} = \gamma H_a^{3/2}, \quad \text{E21}$$

$$F_{6b} = \frac{\sqrt{B \times H_b^3}}{L^2} = \gamma H_b^{3/2}, \quad \text{E22}$$

$$F_{6c} = \frac{\sqrt{B \times H_c^3}}{L^2} = \gamma H_c^{3/2}, \quad \text{E23}$$

$$F_{6d} = \frac{\sqrt{B \times H_d^3}}{L^2} = \gamma H_d^{3/2}, \quad \text{E24}$$

$$F_{6e} = \frac{\sqrt{B \times H_e^3}}{L^2} = \gamma H_e^{3/2}, \quad \text{E25}$$

wherein L and B are the longitude and the widths of the reception elements 51a–51e, Ha–He are the thicknesses of the reception elements 61a–61e respectively, and $\gamma$ is $B^{1/2}/L^2$.

Then, by substituting the equations E21 and E22 into the equation (F6b=F6a+8×F6a/Q) representing the primary resonance frequency F6b of the reception element 61b, an equation E26

$$H_b = H_a\left(1 + \frac{8}{Q}\right)^{2/3} \quad \text{E26}$$

is obtained.

In addition, by substituting the equations E21 and E24 into the equation (F6d=F6a−8×F6a/Q) representing the primary resonance frequency F6d of the reception element 61d, an equation E27

$$H_b = H_a\left(1 - \frac{8}{Q}\right)^{2/3} \quad \text{E27}$$

is obtained.

In addition, by substituting the equations E22 and E23 into the equation (F6c=F6b+8×F6b/Q) representing the primary resonance frequency F6c of the reception element 61c, an equation E28

$$H_c = H_b\left(1 + \frac{8}{Q}\right)^{2/3} = H_a\left(1 + \frac{8}{Q}\right)^{4/9} \quad \text{E28}$$

is obtained.

In addition, by substituting the equations E24 and E25 into the equation (F6e=F6d−8×F6d/Q) representing the primary resonance frequency F6e of the reception element 61e, an equation E29

$$H_e = H_b \left(1 - \frac{8}{Q}\right)^{2/3} = H_a \left(1 - \frac{8}{Q}\right)^{4/9} \quad \text{E29}$$

is obtained.

Therefore, relative values of the widths Hb–He of the reception elements 61b–61e to the width Ha of the reception element 61a can be calculated by obtaining the resonance value Q through a simulation or an experimental measurement and substituting the obtained resonance value Q into the equations E26–E29.

For example, if the resonance value Q equals 60, the Hb, Hc, Hd, and He approximately equal 1.09×Ha, 1.18×Ha, 0.91×Ha, and 0.83×Ha.

[3-3]

The effects and the advantages described in [3-1] can be brought in practice by adjusting the thicknesses Ha–He of the reception elements 61a–61e as described in [3-2].

Thus, in the third embodiment, the acoustic crosstalk among the reception elements 61a–61e can be diminished and the accuracy of determining the position and the distance of the target object can be improved, by making the thicknesses Ba–Be uneven so that their primary resonance frequencies become uneven.

In addition, since the effects and the advantages of the third embodiment can be achieved by simply making the thicknesses Ha–He uneven, an unordinary process is not necessary in manufacturing the receiver 60. Therefore, it is possible to reduce the manufacturing cost of the receiver 60 compared to the receiver described in JP-H5-347797-A which requires a process for injecting the filling materials.

In addition, since the intervals among the reception elements 61a–61e can be minimized for preventing the transmissions of the vibrations among them, the receiver 60 can be designed to be smaller and more lightweight by an amount of the filling materials required for the receiver described in JP-H5-347797-A.

Moreover, in the third embodiment, since the receiver 60 has a shape of a rectangular plate as a whole, structures for fixing both longitudinal ends of the reception elements 61a–61e can be simpler than those of the receiver 10 of the first embodiment. Therefore, it is possible to manufacture the receiver 60 more easily, which reduces the manufacturing cost of the receiver 60.

Furthermore, the receiver 60 can be designed so that the width of the receiver 60 is smaller than that of the receiver 50 and therefore that the size of the receiver 60 as seen from up above is smaller than that of the receiver 50. Therefore a volume occupied by the receiver 60 installed in a package (not shown) can be smaller. As a result, the ultrasonic sensor of the third embodiment can be designed smaller and more lightweight.

Figure 11:
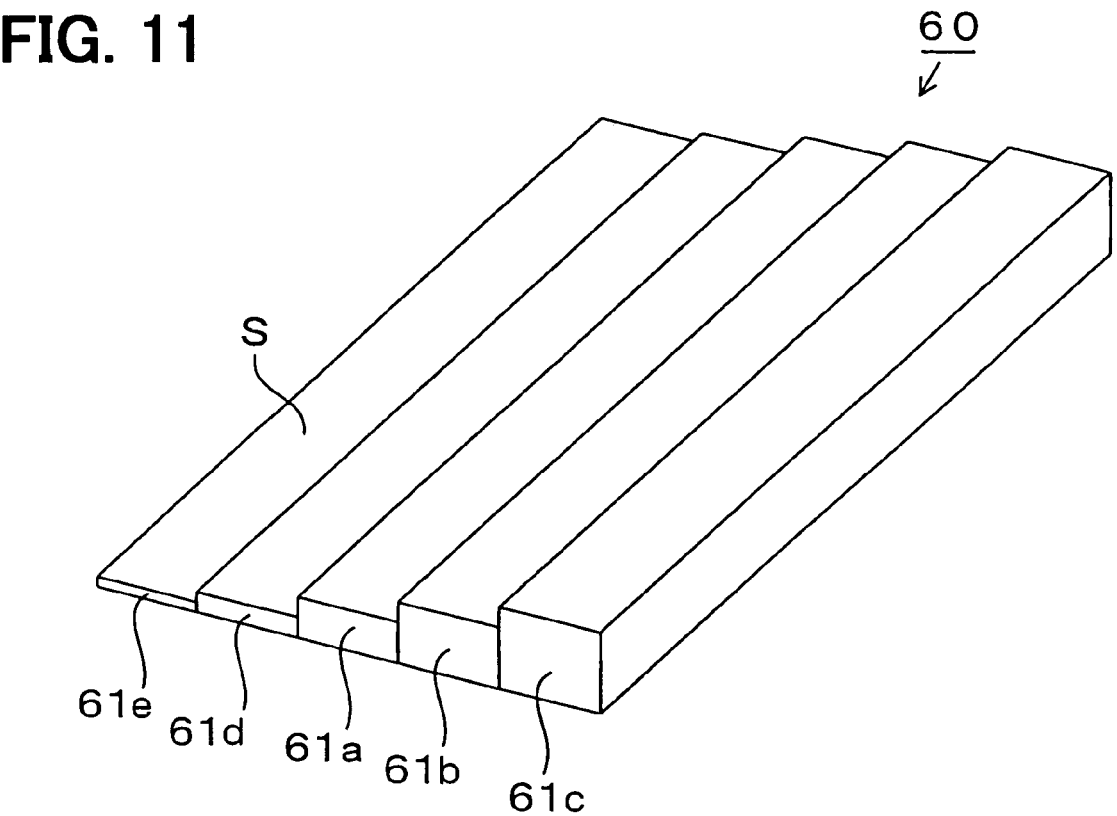
FIG. 11 is a perspective view showing a first modification of the third embodiment.
Figure 12:
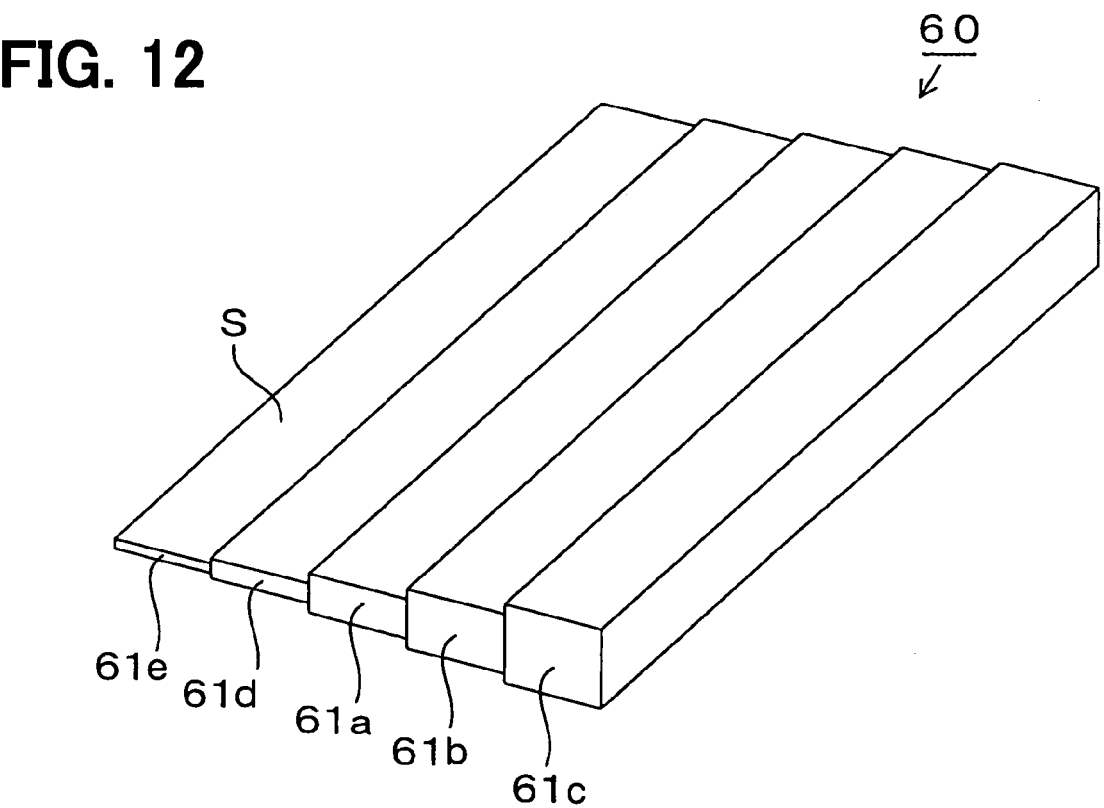
FIG. 12 is a perspective view showing a second modification of the third embodiment.

The reception surfaces S of the reception elements 61a–61e may have different surface levels. For example, as shown in FIG. 11, the reception elements 61a–61e may be arranged so that opposite surfaces opposite to the surface S have the same surface level. Alternatively, as shown in FIG. 12, the reception elements 61a–61e may have the opposite surfaces having different surface levels as well as the reception surfaces S having the different surface levels.

However, it is preferable to make the reception surfaces S have the same level in order to improve the accuracy of detecting the position and distance of the target object. If the surfaces S have the different surface levels, it is necessary to correct gaps of timings in which the reception elements 61a–61e receive an ultrasonic signal, which requires an intricate circuit for processing signals generated by the receiver 60. In contrast, if the surfaces S have the same level, it is unnecessary to correct the gaps of the reception timings and therefore the circuit can be simplified.

[3-5]

Figure 13:
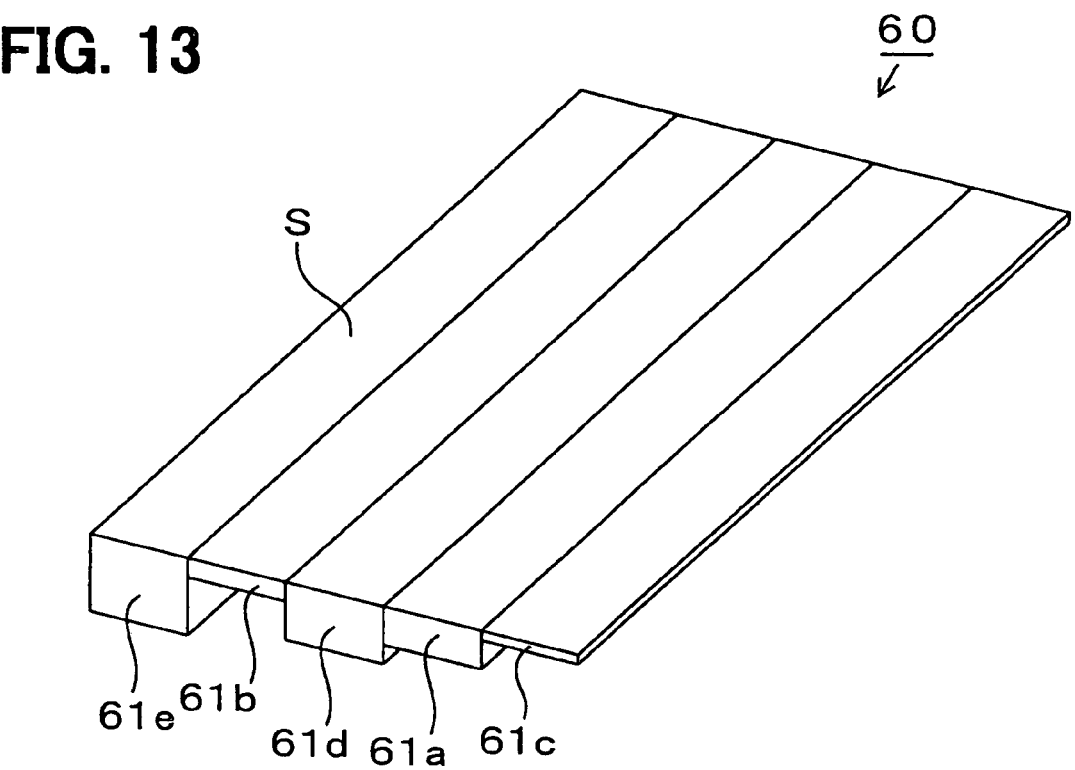
FIG. 13 is a perspective view showing a third modification of the third embodiment.

It is not necessary to align, as shown in FIG. 10, the reception elements 61a–61e in the order of their thicknesses H. As shown in FIG. 13, the reception elements 61a–61e may be aligned in an arbitrary order irrespective of their thicknesses H.

In the above two cases shown in FIGS. 10, and 13, as long as the transmissions of the vibrations among the reception elements 61a–16e are perfectly blocked, there is no difference between the two cases in the effect of diminishing the acoustic crosstalk.

However, since it is impossible to perfectly block the transmissions among the reception elements 61a–61e, there is a small difference between the two cases in the effect of diminishing the acoustic crosstalk.

(Fourth Embodiment)

Figure 14:
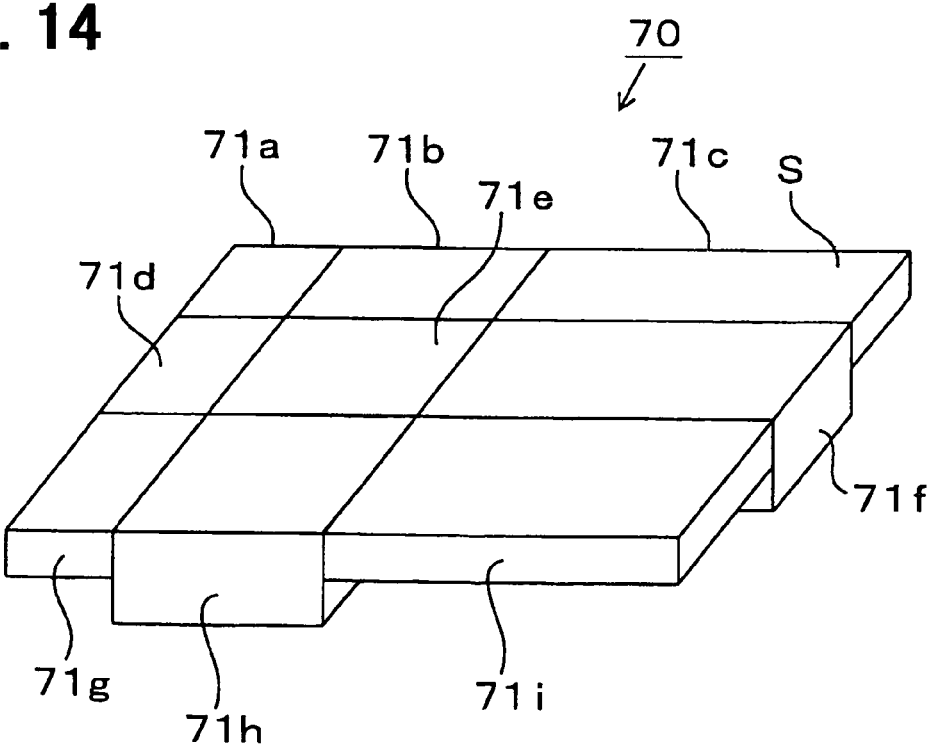
FIG. 14 is a perspective view showing a receiver of an ultrasonic sensor according to a fourth embodiment of the present invention.

An ultrasonic sensor of a fourth embodiment is different from that of the first embodiment in that the ultrasonic sensor of the second embodiment has the receiver 70 shown in FIG. 14 in place of the receiver 10. As shown in FIG. 14, the receiver 70 includes nine reception elements (i.e. conversion devices) 71a–71i, each of which has a shape of a flat rectangular plate.

The reception elements 71a–71i are arranged two-dimensionally on a plane parallel to their width directions and longitudinal directions with their reception surfaces S having the same surface level. Specifically, the reception surfaces S face the same direction and the reception elements 71a–71i are aligned with small intervals in the plane. In addition, the widths B of the reception elements 71a–71i are uneven, the thicknesses H of the reception elements 71a–71i are uneven, and the longitudes L of the reception elements 71a–71i are uneven.

Both ends along the width direction or the longitudinal direction of each of the reception elements 71a–71i are fixed to a fixing member (not shown), so that the ends do not vibrate. The receiver 70 may be manufactured in any way. For example, the receiver 70 may be manufactured by constructing each of the reception elements 71a–71i separately and putting them together. Alternatively, the receiver 70 may be manufactured as a single body on a semiconductor substrate by utilizing the MEMS (Micro Electro Mechanical Systems). Structures of the reception elements 71a–71i are the same as those of the reception elements 11a–11e.

The receiver 70 achieves the same effects and advantages as described in [1-1]–[1-4], if the longitudes, widths, and thicknesses of the reception elements 71a–71i are adjusted so that they have different primary resonance frequencies. In addition, it is possible to further improve the accuracy of detection of the position and distance of the target object, by arranging the reception elements 71a–71i two-dimensionally.

(Other Embodiments)

The present invention should not be limited to the embodiments discussed above and shown in the figures, but may be implemented in various ways without departing from the spirit of the invention.

[First Additional Embodiment]

For example, the number of reception elements which the receiver includes may be other than five and nine. The accuracy of the detection of the position and the distance of the target object gets better as the number grows. Therefore, the optimum number of the reception elements and the optimum intervals among the reception elements may be experimentally determined based on required accuracy by cut and try.

[Second Additional Embodiment]

According to the equation E1, the displacement x becomes approximately 1/100 of the Xmax in the case when the frequency f shown in FIG. 5 is different by ±7×f1/Q from the primary resonance frequency f1.

In the case that F1$b$ is larger by 7×F1$a$/Q than F1$a$ and F1$d$ is smaller by 7×F1$a$/Q than F1$a$, wherein F1$a$, F1$b$, and F1$d$ are the primary resonance frequencies of the reception elements 11$a$, 11$b$, and 11$d$ respectively, the influence of the vibration among the reception elements 11$a$, 11$b$, and 11$d$ is 1/100 of the maximum influence.

In addition, it is preferable that the primary resonance frequency F1$c$ of the reception element 11$c$ located in alignment with (specifically next to) the reception element 11$b$ is larger by 7×F1$b$/Q than F1$b$. Moreover, it is preferable that the primary resonance frequency F1$e$ of the reception element lie located in alignment with (specifically next to) the reception element 11$d$ is smaller by 7×F1$d$/Q than F1$d$.

Thus, by making the primary resonance frequencies F1$a$–F1$e$ different from each other, the influences between their vibrations can be reduced to approximately 1/100 of the maximum influence, which is practically negligible. Then the acoustic crosstalk among the reception elements 11$a$–11$e$ can be diminished and the accuracy of determining the position and the distance of the target object can be improved.

Thus, the differences among the primary resonance frequencies F1$a$–F1$e$ increase as the coefficient n in an equation E30 increases.

$$f=f1\pm n\times f1/Q. \quad \text{E30}$$

Therefore, by increasing the coefficient n, the influence of the vibrations among the reception elements 11$a$–11$e$ is diminished and the accuracy of determining the position and the distance of the target object can be improved.

On the other hand, by increasing the coefficient n, the differences among the longitudes of L of the reception elements 11$a$–11$e$ increase and therefore the entire size and weight of the receiver 10 increase.

Therefore, the optimum coefficient n can be experimentally determined by try and error. The values 7 and 8 described above as the coefficient n are sufficient for practical use.

Likewise, in the second to fourth embodiments, the values 7 and 8 as the coefficient n are sufficient for practical use.

[Third Additional Embodiment]

The receivers 10, 50, and 60 of the first to third embodiments are fixed at their both longitudinal ends. However, each of the receivers 10, 50, and 60 may be fixed only at its one longitudinal end.

In addition, the receiver 70 of the fourth embodiment is fixed at its both ends along its longitudinal or width direction. However, the receiver 70 may be fixed only at its one end along its longitudinal or width direction.

[Fourth Additional Embodiment]

In each of the receivers 10, 50, and 70 in the first, second, and fourth embodiments, the reception elements may have the reception surfaces S having different surface levels.

[Fifth Additional Embodiment]

The structures of the reception elements described above can be used for the transmitter which converts an electric signal to an ultrasonic signal and transmits the ultrasonic signal. In other words, the reception elements 11$a$–11$e$, 51$a$–51$e$, 61$a$–61$e$, and 71$a$–71$i$ may function as transmission elements (conversion devices) of the transmitter. In this case, the reception surfaces S of the reception elements function as transmission surfaces transmitting the ultrasonic signal.

For example, if the reception elements have the first structures (piezoelectric structures) as shown in FIG. 2, the reception electrodes 22$a$–22$e$ transmit the ultrasonic signal when the piezoelectric complex 23 vibrates as a result of the piezoelectric effect according to the voltages applied between the bottom electrode 21 and the reception electrodes 22$a$–22$e$.

Alternatively, if the reception elements have the second structures (piezoelectric structures) as shown in FIG. 3, the reception electrodes 22$a$–22$e$ transmit the ultrasonic signal when the dielectric layers 31$a$–31$e$ vibrate as a result of the piezoelectric effect according to the voltages applied between the bottom electrode 21 and the reception electrodes 22$a$–22$e$.

Furthermore, if the reception elements has the third structures (capacitance type structures) as shown in FIG. 4, the reception electrodes 22$a$–22$e$ transmit the ultrasonic signal driven by the electrostatic force which is generated between the bottom electrode 21 and the reception electrodes 22$a$–22$e$ based on the electric signal supplied to the bottom electrode 21 and the reception electrodes 22$a$–22$e$.

In the case that the reception elements functions as the transmission elements of the transmitter, the transmitter is capable of transmitting an ultrasonic chord, because the primary resonance frequencies of the transmission elements are uneven.

What is claimed is:

1. An ultrasonic sensor, comprising:
   conversion devices for at least one of:
      converting a first ultrasonic signal to an electric signal after receiving the first ultrasonic signal; and
      transmitting a second ultrasonic signal after converting an electric signal to the second ultrasonic signal,
   wherein sizes of the conversion devices are uneven and primary resonance frequencies of the conversion devices are uneven,
   wherein each conversion device of the conversion devices has a shape of a flat rectangular plate having a certain surface which functions as at least one of a reception surface for receiving the first ultrasonic signal and a transmission surface for transmitting the second ultrasonic signal;
   wherein the conversion devices are arranged one-dimensionally on a plane so that:
      the certain surfaces of the conversion devices face the same direction;
      the conversion devices are aligned in width directions of the conversion devices; and
      certain longitudinal ends of the conversion devices at a certain longitudinal side of the conversion devices are aligned in a generally straight line;

wherein widths of the conversion devices are even and thickness of the conversion devices are even;

wherein longitudes of the conversion devices are uneven;

wherein both longitudinal ends of every conversion devices are fixed to prevent the longitudinal ends from vibrating;

wherein resonance values Q of the conversion devices are the same;

wherein a first primary resonance frequency f1 of a first one of the conversion devices which is next highest to a second primary resonance frequency f2 of a second one of the conversion devices is represented by a following equation:

$$f1 = f2 - n \times f2/Q,$$

wherein the coefficient n is either of 7 and 8.

2. The ultrasonic sensor according to claim 1, wherein the conversion devices are arranged so that the certain faces have the same surface level.

3. The ultrasonic sensor according to claim 1, wherein a longitude L, a width B, a thickness H, a primary resonance frequency of each of conversion devices have a relation represented by a following equation:

$$f = (B \times H^3)^{1/2}/L^2.$$

4. The ultrasonic sensor according to claim 1, wherein the conversion devices are piezoelectric.

5. The ultrasonic sensor according to claim 1, wherein the conversion devices are capacitance type conversion devices.

6. The ultrasonic sensor according to claim 1, wherein resonance values Q of the conversion devices are the same, a first primary resonance frequency f1 of a first one of the conversion device which is next lowest to a second primary resonance frequency f2 of a second one of the conversion device is represented by a following equation:

$$f1 = f2 + n \times f2Q,$$

wherein the coefficient n is a positive integer.

* * * * *